G. ROBERGEL.
PROCESS FOR THE MANUFACTURE OF BOLTS.
APPLICATION FILED AUG. 24, 1918.
1,346,058.
Patented July 6, 1920.
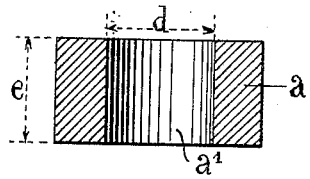
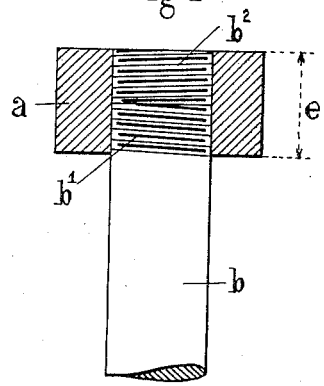
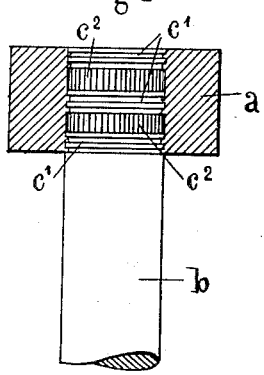
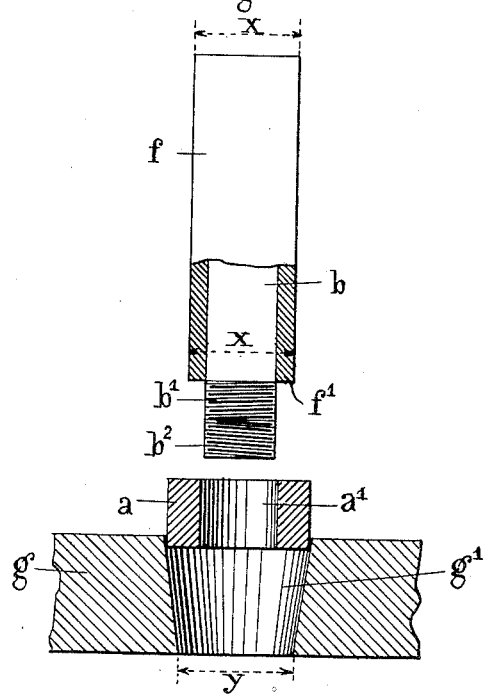
INVENTOR
GABRIEL ROBERGEL
BY Howson and Howson
ATTORNEYS

UNITED STATES PATENT OFFICE.

GABRIEL ROBERGEL, OF MONTREUIL-SOUS-BOIS, FRANCE.

PROCESS FOR THE MANUFACTURE OF BOLTS.

1,346,058. Specification of Letters Patent. Patented July 6, 1920.

Application filed August 24, 1918. Serial No. 251,273.

*To all whom it may concern:*

Be it known that I, GABRIEL ROBERGEL, a citizen of the Republic of France, and a resident of 81 Rue Marceau, Montreuil-sous-Bois, Department of Seine, France, have invented new and useful Improvements in Processes for the Manufacture of Bolts, of which the following is a specification.

This invention relates to a process for the manufacture of bolts, consisting in the head being formed from a piece of metal provided in the center with a hole with smooth wall, which is pressed on a part of the stem of the bolt provided with flutes, grooves, or projections of any kind, so as to produce a thorough connection of the bolt head with its stem and to avoid any movement of the one relatively to the other.

The stem may be provided for instance, in its part intended to be connected to the bolt head, with a part with a right hand thread, and with a part with a left hand thread, so as to prevent, during the tightening, any movement of rotation of the head on the stem, either in one or in the other direction, as well as any longitudinal movement in the direction of the stem of the bolt.

The accompanying drawing shows by way of example a method of carrying out the invention:

Figure 1 is a section through the bolt head before it is joined to the stem and

Fig. 2 a section showing the head connected to the stem of the bolt.

Fig. 3 is a vertical section through apparatus suitable for securing the bolt head on its shank; and Fig. 4 is a section through a bolt head showing a modified construction.

Instead of proceeding in the usual way for obtaining bolts by cutting out of a solid of desired dimensions (which implies a considerable loss of material and loss of time), the bolts are manufactured according to the invention in the following manner: A metal piece $a$ of suitable dimensions is prepared and provided in the center with a circular hole $a^1$ with smooth wall, the diameter $d$ of which is very slightly greater than that of the stem of the bolt to which it is to be secured. On the other hand, the said stem or rod $b$ is prepared by providing it, on a total length corresponding to the thickness $e$ of the metal piece $a$, with a screwthread, half $b^1$ in one direction, and half $b^2$ in the other. The piece $a$ is brought to a red heat, the screwthreaded part $b^1$, $b^2$ of the bolt $b$ is brought into the interior of the hole $a^1$ and the piece $a$ (intended to form the bolt head) is secured to the rod $b$ by compression in a conical stock, owing to which the metal of the said piece $a$ is forced into the screwthread $b^1$, $b^2$ of the rod $b$, so that a thorough connection is insured between the stem and the head of the bolt. This may be accomplished as shown in Fig. 3 by supporting the stem $b$ of the bolt in a tubular plunger $f$, leaving the threaded neck $b^1$, $b^2$ exposed. The head blank $a$ is supported beneath the stem $b$ in a conical hole $g^1$ in the die $g$. As the plunger $f$ descends the neck of the bolt enters the hole $a^1$ in the blank and the latter is then engaged by the lower end $f^1$ of the plunger and pressed down through the conical hole $g^1$ in the die $g$. This compresses the head $a$ on the bolt neck and forces the material of the bolt head into the channels formed by the threads $b^1$, $b^2$, so that a firm union between the parts is attained. Inasmuch as the diameter $x$ of the plunger $f$ is less than the least diameter $y$ of the hole $g^1$, in the die, the bolt shank with head attached may be discharged through the die.

Owing to the parts $b^1$, $b^2$ being screwthreaded, one to the left, and the other to the right, there is no danger of the head becoming separated from the stem during the tightening of the bolt, either owing to rotation in one or in the other direction, or owing to a movement in the longitudinal direction of the rod.

It goes without saying that this method of carrying out the invention has been given merely by way of example, and that the screwthreaded parts $b^1$, $b^2$ could be replaced by any flutes, grooves, asperities or projections preventing any movement of the rod relatively to the head of the bolt; for instance as shown in Fig. 4, on the end of the bolt stem intended to be secured to the head by its engagement with the hole $a^1$ of the metal piece $a$, could be provided several series of transverse grooves $c^1$ making impossible any longitudinal movement of the stem in the head, divided by longitudinal grooves $c^2$ intended to prevent any rotation of the head relatively to the stem.

As explained above, the head and the stem of the bolt are joined preferably by heating the metal piece $a$ and by compressing it hot when it is of the same metal as the stem $a$; when it is of a more malleable metal than the latter, a suitable joining could be obtained by compression when cold.

What I claim is:

1. A bolt having a shank and an independent bolt head compressed thereon, one of the surfaces at the joint between said shank and head having serrations running at an angle to each other to form an interlocking engagement between the parts and thus to prevent relative rotation or endwise separation of the parts.

2. A bolt having a shank and an independent bolt head compressed thereon, the head end of the shank having grooves running at an angle to each other to form an interlocking engagement with the bolt head when the latter is compressed thereon.

3. A bolt having a shank and an independent bolt head compressed thereon, the head end of the shank having a part screw threaded to the right, and an adjacent part screw threaded to the left, to form an interlocking engagement with the bolt head when the latter is compressed thereon.

In testimony whereof I have signed my name to this specification.

GABRIEL ROBERGEL.

Witnesses:
CHARLES DOUY,
M. DEFÉVRIMONT.